Jan. 26, 1971     G. P. D'ARCY     3,557,612
SOIL STRESS GAUGE
Filed Jan. 7, 1969
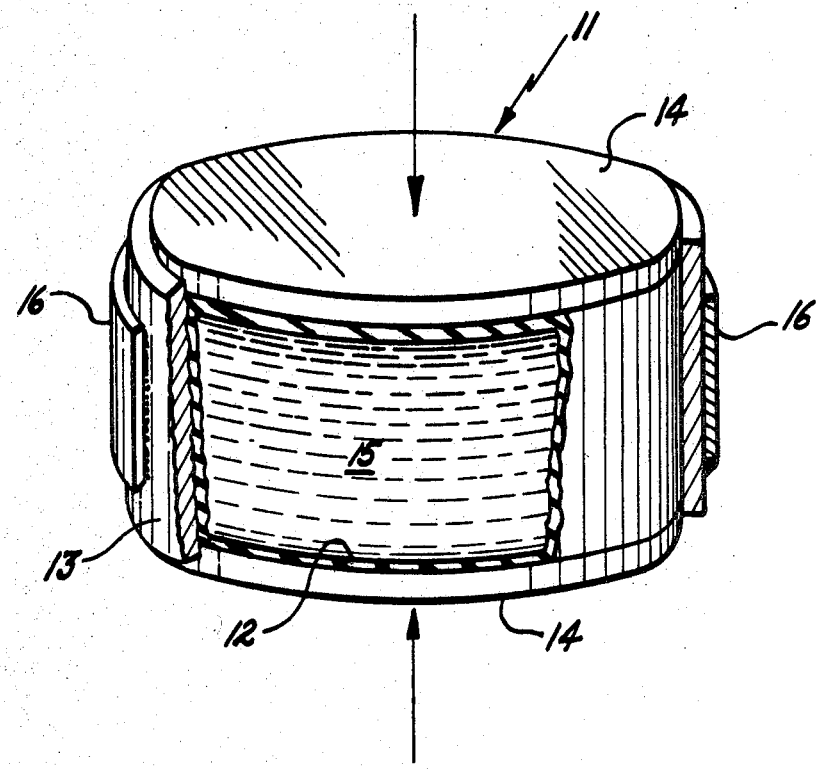
INVENTOR.
GERALD P. D'ARCY
BY Harry A. Herbert, Jr.
and Arsen Tashjian
ATTORNEYS

United States Patent Office 3,557,612
Patented Jan. 26, 1971

3,557,612
SOIL STRESS GAUGE
Gerald P. D'Arcy, Livermore, Calif., assignor to the United States of America as represented by the Secretary of the Air Force
Filed Jan. 7, 1969, Ser. No. 789,456
Int. Cl. G01l 1/22
U.S. Cl. 73—94                                               4 Claims

ABSTRACT OF THE DISCLOSURE

A soil stress gauge which effectively matches nonlinear stress-strain properties of soil, including a flexible container filled with a fluid medium constrained inside a cylindrical ring. Freely moving diaphragm plates disposed coaxially at each end of the cylindrical ring transmit stresses applied parallel to the longitudinal axis of the gauge to the fluid. The fluid translates longitudinal stresses to radial stresses which expand the cylindrical ring. The expansion of the ring is detected and measured by strain gauge means attached thereto.

BACKGROUND OF THE INVENTION

This invention relates to a novel soil stress guage for measuring free field stresses produced by underground explosives and, more particularly, the invention is concerned with providing a soil stress gauge which effectively matches the nonlinear stress-strain properties of soil in which it is placed.

Soil stress gauges are utilized to correlate the loading on structures with free field stresses produced by underground nuclear tests or the like. Specifically, a gauge must be capable of measuring large stress pulses with a rise-time on the order of 2 milliseconds. A critical factor controlling the success of soil stress gauges under such circumstances is a phenomenon referred to as "arching," wherein a stress load on a section of soil is diverted through the legs of a structural arch which forms in the soil. Consequently, a soil stress gauge may not see the actual stress load on the soil if arching occurs across the sensing face of the detector.

Present practices for eliminating arch is to make the gauge much "stiffer" than the soil, i.e., much less resilient than soil. However, such gauges give very poor performances in the field, believed to be due to a large relative dynamic displacement of the gauges in the soil when subjected to large stress pulses. Such displacement is caused by the dissimilar stress-strain properties of soil and gauge at high stress levels.

In order to overcome these problems, a soil stress gauge is required which effectively matches the properties of soil in which it is placed, which prevents structural arch formation in the soil across the sensing face of the gauge, and which minimizes relative displacement of the gauge in the soil at high stress levels.

SUMMARY OF THE INVENTION

The invention provides a soil stress gauge which effectively matches the nonlinear stress-strain properties of soil. The gauge comprises a very flexible container filled with a fluid medium constrained inside a cylindrical ring. Freely moving diaphragm plates disposed coaxially at each end of the cylindrical ring transmit stresses applied parallel to the longitudinal axis of the gauge to the fluid. The fluid translates the longitudinal stresses to radial stresses which expand the cylindrical ring. The expansion of the cylindrical ring is detected and measured by strain gauge means secured thereto. The fluid medium, the wall thickness of the cylindrical ring, and the cylindrical ring material are chosen and tailored such that the gauge will effectively match the stress-strain properties of the soil in which it is placed.

Accordingly, it is an object of the invention to provide a soil stress gauge which is versatile and durable and can be utilized to accurately measure shock waves induced in soil by nuclear detonation.

Another object of the invention is to provide a soil stress gauge suitable for correlating the loading on structures with free field stresses produced by underground nuclear tests.

Still another object of the invention is to provide a soil stress gauge wherein the force exerted by the soil resisting expansion of a cylindrical ring surrounding the gauge is proportional to the compression modulus of the soil.

A further object of the invention is to provide a soil stress gauge which utilizes a fluid medium constrained inside a cylindrical ring and two diaphragm plates. The fluid medium is varied depending on the compression modulus of the material in which it is placed.

A still further object of the invention is to provide a soil stress gauge wherein a fluid medium constrained therein effectively translates longitudinal stress vectors produced by shock waves into radial stress vectors which are detected and measured by strain gauges.

These and other objects, features and advantages will become more apparent after considering the description that follows taken in conjunction with the attached drawing and appended claims.

DESCRIPTION OF THE DRAWING

The figure is a plan view, partially sectioned and cut away, showing a preferred embodiment of the soil stress gauge according to the invention.

DESCRIPTION OF A PREFERRED EMBODIMENT

Referring now to the drawing, the soil stress gauge 11 includes a flexible container 12, such as a balloon, which is constrained inside a cylindrical ring 13 by solid circular diaphragm plates 14. The plates 14 are dimensioned to allow substantially free axial movement within the cylindrical ring 13.

Inside the flexible container 12, there is disposed a fluid medium 15 which is chosen on the basis of the particular soil properties in which the device 11 is to be placed. Strain gauges 16 are positioned on the outer circumferential surface of the cylindrical ring 13 for detecting and measuring the change in dimensions thereof. The material as well as the wall thickness of the cylindrical ring 13 is chosen and designed such that the soil gauge 11 effectively matches the stress-strain properties of the soil in which it is placed.

The herein described gauge can provide accurate detection and measurement of shock waves in soil induced by a nuclear detonation over a wide dynamic range. Further, the gauge 11 does not require extensive testing and calibration after emplacement, since extensive analysis and calibration is accomplished prior to emplacement.

MODE OF OPERATION

Operation of the hereinbefore described soil stress gauge 11 is as follows: The gauge is emplaced in a soil medium so as to receive and measure stress vectors parallel to its longitudinal axis. Specifically, a stress shock wave depress the diaphragm plate 14, compressing the fluid 15 in the flexible container 12. The compressed fluid expands the cylindrical ring 13, the expansion of which is detected and measured by the strain gauges 16. More concisely, fluid medium 15 effectively translates longitudinal stress vectors to radial stress vectors.

Three basic effects tend to match the stress-strain properties of the gauge 11 to that of the soil in which it is placed. First, most fluids are less compressible with increasing pressure; second, the area of the cylindrical ring 13 acted on by the fluid medium 15 becomes less as it is compressed; and third, the constraining medium around the cylindrical ring 13 is soil. The third effect is the most significant because the force exerted by the soil-resisting expansion of the ring 13 is proportional to the compression modulus of the soil.

In summary, the above effects increase the "stiffness" of the invented gauge with increasing applied stress in a manner similar to the soil in which the gauge is placed.

The wall thickness of the cylindrical ring 13 and the particular fluid medium 15 are expressly chosen and tailored such that the compression modulus of the soil in the particular stress range of interest. For example, if the gauge is to be placed in a material with a very high compression modulus, such as rock, a suitable fluid medium would be mercury, whose compressibility is close to that of rocks. If, on the other hand, the gauge is to be placed in a soil medium which has nonlinear stress-strain properties, various liquid alcohols are more suited as the liquid medium, because the compressibility of alcohols vary in a similar nonlinear fashion with applied stress.

Analytical computer techniques can be utilized to correlate gauge properties and the soil material in which the gauge is to be placed.

Although the invention has been illustrated in the accompanying drawings and described in the foregoing specification in terms of a preferred embodiment thereof, the invention is not limited to this embodiment or to the particular configurations mentioned. It will be apparent to those skilled in the art that my invention can be used for the detection and measurement of other types of stresses in soil such as seismic disturbances. Also, it should be understood that various changes, alterations, modifications, and substitutions, particularly with respect to the constructions details, can be made in the arrangement of the several elements without departing from the true spirit and scope of the appended claims.

Having thus described my invention, what I claim and desire to secure by Letters Patent of the United States is:

1. A soil stress gauge for detecting and measuring stresses in soil comprising a cylindrical ring of predetermined wall thickness positioned in a constraining medium of soil, a closed flexible container positioned within said cylindrical ring, a fluid medium disposed within and substantially filling said flexible container, a pair of solid circular diaphragm plates, one of said diaphragm plates being positioned within one end of said cylindrical ring, the other of said diaphragm plates being positioned in the other end of said cylindrical ring, said circular plates being dimensioned to allow substantially free axial movement within said cylindrical ring, and strain gauge means attached to the outer surface of said cylindrical ring for detecting and measuring the effective change in dimension thereof which is proportional to the stresses in the soil acting on said diaphragm plates.

2. The soil stress gauge defined in claim 1 wherein the wall thickness of said cylindrical ring is proportioned such that the coaction thereof with said fluid medium matches the compression modulus of the soil being measured.

3. The soil stress gauge defined in claim 1 wherein the fluid medium disposed in said flexible container is mercury for measuring stresses in solid rock.

4. The soil stress gauge defined in claim 1 wherein the fluid medium disposed in said flexible container is liquid alcohol for measuring stresses in soil of nonlinear stress-strain properties.

References Cited

UNITED STATES PATENTS

| | | | |
|---|---|---|---|
| 1,533,281 | 4/1925 | Tautz | 73—102 |
| 3,313,151 | 4/1967 | Kaye | 73—141(A) |
| 3,392,785 | 7/1968 | King | 166—187X |

JERRY W. MYRACLE, Primary Examiner

U.S. Cl. X.R.

73—141